(12) United States Patent
Wigger (10) Patent No.: US 7,536,717 B2
(45) Date of Patent: May 19, 2009

(54) FAST SEARCHING OF LIST FOR IP FILTERING

(75) Inventor: William D. Wigger, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1185 days.

(21) Appl. No.: 10/775,479

(22) Filed: Feb. 10, 2004

(65) Prior Publication Data

US 2005/0177544 A1  Aug. 11, 2005

(51) Int. Cl.
*G06F 21/00* (2006.01)
(52) U.S. Cl. ......................................... 726/13
(58) Field of Classification Search ...................... 707/1; 726/11, 13; 709/230–238
See application file for complete search history.

(56) References Cited

U.S. PATENT DOCUMENTS

| 5,684,945 | A | * | 11/1997 | Chen et al. | 714/20 |
| 6,631,466 | B1 | | 10/2003 | Chopra et al. | 712/300 |
| 2002/0147825 | A1 | | 10/2002 | Stein et al. | 709/230 |
| 2002/0178169 | A1 | * | 11/2002 | Nair et al. | 707/100 |
| 2002/0196796 | A1 | * | 12/2002 | Ambe et al. | 370/401 |

OTHER PUBLICATIONS

McAuley et al., "Fast routing table lookup using CAMs", Networking: Foundation for the future, IEEE Computer and Communications Societies, vol. 3, pp. 1382-1391, Apr. 1993.*
Decasper et al. "Router Plugins: A software Architecture for Next-Generation Routers", IEEE/ACM Transactions on Networking, vol. 8, Issue 1, Feb. 2000 pp. 2-15.*

* cited by examiner

*Primary Examiner*—Gilberto Barron, Jr.
*Assistant Examiner*—Hadi Armouche
(74) *Attorney, Agent, or Firm*—Yee & Associates, P.C.; A. Bruce Clay; Rudolf O. Siegesmund (57) ABSTRACT

A method for filtering data packets through computers on the Internet that allows a computer to determine whether an incoming numbered list is present in a numbered list data set. The present invention comprises an Array Creation Program (ACP) and an Array Matching Program (AMP). The ACP creates a plurality of arrays from the numbered list data set. The values of the array fields are based on the numbers in the numbered lists. The AMP analyzes the numbers in the incoming numbered list to determine the hexadecimal values in the array fields associated with the numbers in the incoming numbered list. The AMP uses a counter to process the numbers in the incoming numbered list. If the counter becomes zero, then the incoming numbered list is not present in the numbered list data set.

6 Claims, 10 Drawing Sheets

FIG. 1
Prior Art

| 1st Number | 2nd Number | 3rd Number | 4th Number |
|---|---|---|---|
| 1 | 2 | 2 | 2 |
| - | 3 | 3 | 4 |
| - | 4 | 2 | 4 |
| - | 2 | 3 | 2 |
| 4 | - | 3 | 6 |

| numbered list | ID |
|---|---|
| 1.2.3.4 | 1 |
| 1.2.*.5 | 2 |
| 1.1.3.4 | 4 |
| *.*.5.4 | 8 |

FIG. 6

| Index | Array 1 | Array 2 | Array 3 | Array 4 |
|---|---|---|---|---|
| 0 | 0x8 | 0x8 | 0x2 | 0x0 |
| 1 | 0xF | 0xC | 0x2 | 0x0 |
| 2 | 0x8 | 0xB | 0x2 | 0x0 |
| 3 | 0x8 | 0x8 | 0x7 | 0x0 |
| 4 | 0x8 | 0x8 | 0x2 | 0xD |
| 5 | 0x8 | 0x8 | 0xA | 0x2 |
| 6 | 0x8 | 0x8 | 0x2 | 0x0 |
| 7 | 0x8 | 0x8 | 0x2 | 0x0 |
| 8 | 0x8 | 0x8 | 0x2 | 0x0 |
| 9 | 0x8 | 0x8 | 0x2 | 0x0 |
| A | 0x8 | 0x8 | 0x2 | 0x0 |
| B | 0x8 | 0x8 | 0x2 | 0x0 |
| C | 0x8 | 0x8 | 0x2 | 0x0 |
| D | 0x8 | 0x8 | 0x2 | 0x0 |
| E | 0x8 | 0x8 | 0x2 | 0x0 |
| F | 0x8 | 0x8 | 0x2 | 0x0 |

| Number | Array Value | Counter at Step 312 | Counter at Step 324 |
|---|---|---|---|
| 1 | 0xF | N/A | 0xF |
| 2 | 0xB | 0xF | 0xB |
| 6 | 0x2 | 0xB | 0x2 |
| 5 | 0x2 | 0x2 | 0x2 |

FIG. 8B

| Number | Array Value | Counter at Step 312 | Counter at Step 324 |
|---|---|---|---|
| 2 | 0x8 | N/A | 0x8 |
| 3 | 0x8 | 0x8 | 0x8 |
| 2 | 0x2 | 0x8 | 0x0 |
| 5 | Not obtained | Not calculated | Not calculated |

| Key | Hashtable 1 | Hashtable 2 | Hashtable 3 | Hashtable 4 |
|---|---|---|---|---|
| 1 | 0x7 | 0x4 | | |
| 2 | | 0x3 | | |
| 3 | | | 0x5 | |
| 4 | | | | 0xD |
| 5 | | | 0x8 | 0x2 |

FIG. 11

| Index | Wildcard Array |
|---|---|
| 1 | 0x8 |
| 2 | 0x8 |
| 3 | 0x2 |
| 4 | 0x0 |

FIG. 13A

| Number | Hashtable Value | Wildcard array value | First counter at step 512 | Second counter at step 524 | First result at step 520/530 | Second result at step 532 | First counter at step 536 |
|---|---|---|---|---|---|---|---|
| 1 | 0x7 | 0x8 | N/A | N/A | 1111 | N/A | 0xF |
| 2 | 0x3 | 0x8 | 0xF | 0x3 | 1011 | 1011 | 0xB |
| 6 | 0x0 | 0x2 | 0xB | 0x0 | 0010 | 0010 | 0x2 |
| 5 | 0x2 | 0x0 | 0x2 | 0x2 | 0010 | 0010 | 0x2 |

FIG. 13B

| Number | Hashtable Value | Wildcard array value | First counter at step 512 | Second counter at step 524 | First result at step 520/530 | Second result at step 532 | First counter at step 536 |
|---|---|---|---|---|---|---|---|
| 2 | 0x0 | 0x8 | N/A | N/A | 1000 | N/A | 0x8 |
| 3 | 0x0 | 0x8 | 0x8 | 0x0 | 1000 | 1000 | 0x8 |
| 2 | 0x0 | 0x2 | 0x8 | 0x0 | 0010 | 0000 | 0x0 |
| 5 | Not obtained | Not obtained | Not calculated | Not calculated | Not calculated | Not calculated | Not calculated |

FAST SEARCHING OF LIST FOR IP FILTERING

FIELD OF THE INVENTION

The present invention is directed at an improved method for filtering data packets by determining if an incoming data packet IP address is present in a list of IP addresses.

BACKGROUND OF THE INVENTION

Every day, countless data packets are transmitted from one computer to another within computer networks. Each data packet contains a source IP address, which is the where the data packet originated. Each data packet also contains a destination IP address, which is the ultimate destination for the data packet. Both IP addresses are a series of numbers separated by decimals, such as 172.168.4.2. A firewall uses the IP addresses to determine whether to permit a data packet to pass through the firewall. A computer network may have dozens of firewalls, each designed to permit or deny certain types of data packets. Because of the large quantity of data packets processed by each firewall, even small improvements in the processing time per data packet can have significant improvements in the overall efficiency of a single firewall, and thus, the computer network as a whole. Similarly, because Internet routers also use IP address filtering as a method for routing data packets, an increase in router efficiency can be realized by an improvement in filtering efficiency. Therefore, a need exists for an improved method for filtering data packet IP addresses.

Figure 1:
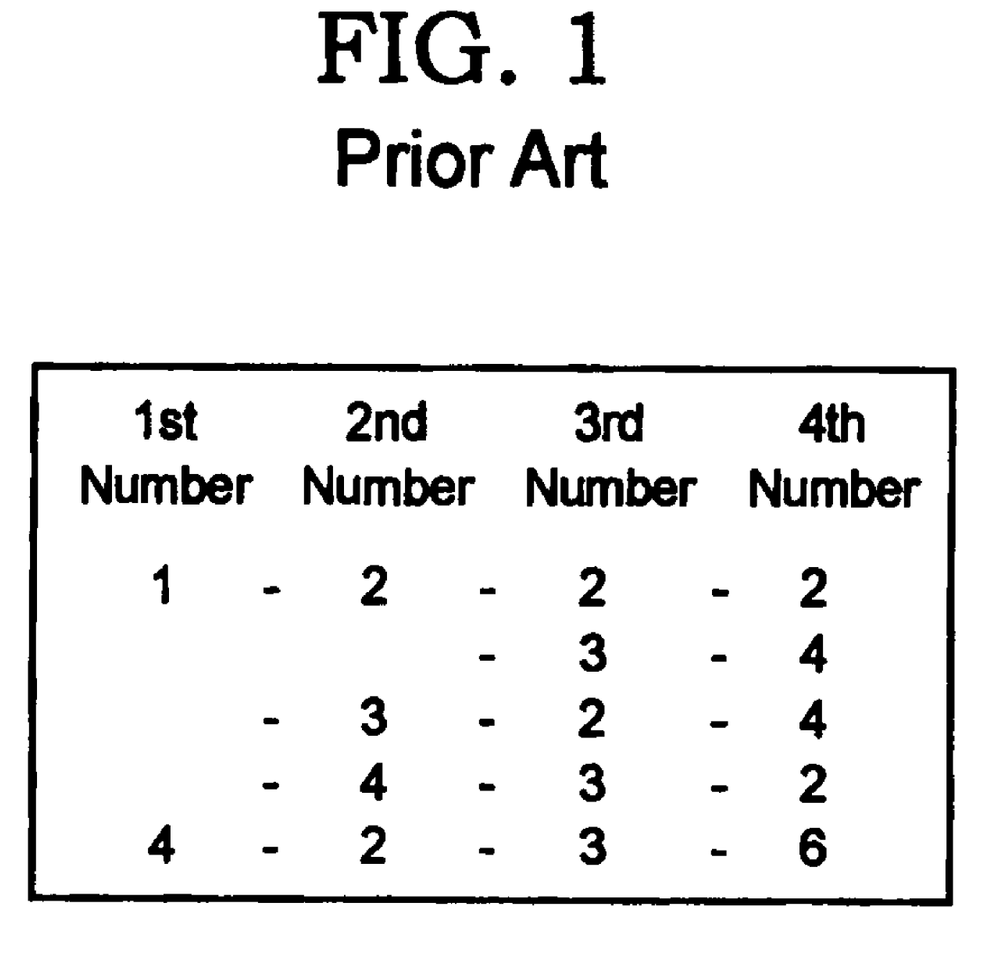
FIG. 1 is an illustration of a prior art numbered list data set tree.

One portion of the IP address filtering process is determining whether the incoming IP address is present in a list of IP addresses. Firewalls can have exclusion lists and/or inclusion lists. In other words, when a firewall receives a data packet, the firewall may determine whether the data packet source IP address is present in a list of allowable data packet IP addresses, determine if the source IP address is present in a list of prohibited data packet IP addresses, or a combination of the two. If the IP address is present in the list of allowable IP addresses and not in the list of prohibited IP addresses, the firewall permits the data packet to pass through the firewall. Otherwise, the firewall denies the data packet passage past the firewall. Thus, the firewall must determine whether an incoming numbered list (i.e. a destination IP address) is present in a numbered list data set (i.e. a list of IP addresses), regardless of whether the numbered list data set is allowable or prohibited numbered lists. For example, the firewall determines whether the incoming numbered list 1.3.2.4 is present in the numbered list data set 1.2.3.4, 1.4.3.2, 1.2.2.2, 1.3.2.4, and 4.2.3.6. The prior art method for determining whether the incoming numbered list is present in a numbered list data set is to create a tree containing all of the numbered lists in the numbered list data set. An example of a prior art tree for the numbered list data set above is illustrated in FIG. 1. In the prior art tree, each level represents a number position. At each level, the firewall makes a determination whether the incoming numbered list matches any of the numbers at that level. If the incoming numbered list matches a number in the tree, then the firewall proceeds to the next level. If the incoming numbered list does not match a number, the incoming numbered list is not present in the numbered list data set. The comparison process continues until the firewall reaches the last level of the tree. Thus, by comparing an incoming numbered list to the tree, a firewall can determine whether an incoming numbered list is present in the numbered list data set.

One of the problems with the tree method for determining whether an incoming numbered list is present in a numbered list data set is that any of the numbered lists from the numbered list data set may contain a wildcard character. A wildcard character is a keyboard character that can be used to represent one or many characters. For example, the asterisk (*) typically represents one or more characters and the question mark (?) typically represents a single character. When a numbered list from the numbered list data set contains a wildcard character, there is at least one level of recursion in the process of determining whether an incoming numbered list is present in the numbered list data set. In other words, at each level in the tree, the firewall must make two determinations: whether any of the nodes represent a wildcard and whether the incoming numbered list matches any of the nodes. If a level contains a matching node and a wildcard node, then the firewall must traverse two paths down from that level. The presence of a wildcard at a lower level would create even more paths for the firewall to trace. Thus, wildcards in the tree lead to an increasing amount of computational steps and an undesirable increase in the time required to determine whether an incoming numbered list is present in a numbered list data set.

Consequently, a need exists in the art for an improved method for determining whether an incoming numbered list is present in a numbered list data set. Moreover, a need exists in the art for a method for determining whether an incoming numbered list is present in a numbered list data set that does not require extra computational steps when the numbered list data set contains a wildcard character. Finally, a need exists for a method for determining whether an incoming numbered list is present in a numbered list data set in which the method eliminates the need for recursive computational sets.

SUMMARY OF THE INVENTION

The present invention, which meets the needs identified above, is an improved method for filtering data packets through a firewall. The method improves over the prior art by allowing a firewall to determine whether an incoming numbered list is present in a numbered list data set in less time than the prior art methods. The present invention is particularly preferable when the numbered list data set and/or the incoming numbered list contain a wildcard character.

The software embodiment of the present invention comprises an Array Creation Program (ACP) and an Array Matching Program (AMP). The ACP assigns an ID to each of the numbered lists in the numbered list data set. The ID is a sequentially increasing power of two (i.e. $2^0=1$, $2^1=2$, $2^2=4$, $2^3=8$, $2^4=16 \ldots$). The ACP then creates a plurality of arrays from the numbered list data set. The ACP modifies the array values based on the numbers in the numbered lists. The ACP only has to create the arrays when the firewall associated with the present invention receives an updated or modified numbered list data set.

When the firewall associated with the present invention receives an incoming numbered list, the AMP analyzes the numbers in the incoming numbered list to determine the hexadecimal values in the array fields associated with the numbers in the incoming numbered list. The AMP uses a counter and a Boolean AND operation to compare the incoming numbered list to the arrays. If the counter ever becomes zero, the AMP indicates that there is no match. After the processing is complete, a non-zero counter indicates that the incoming numbered data list is present in the numbered list data set. The location and quantity of ones (1) present in the binary version of the counter indicates the location of the match and the number of times the incoming numbered list is present in the numbered list data set.

The present invention also includes a Hashtable Creation Program (HCP) and a Hashtable Matching Program (HMP). The HCP is similar to the ACP, with the exception that the HCP creates hashtables instead of arrays for the numbered list data set. The HCP also creates a wildcard array. Hashtables utilize less memory than arrays when there is a large quantity of numbered lists in the numbered list data set. For example, hashtables would be preferable to arrays when processing IPv6 addresses (version 6 IP addresses), which range from zero (0) to $2^{32}$ (4,294,967,296). However, arrays would be preferable to hashtables when processing IPv4 (version 4 IP addresses, which range from zero (0) to two hundred fifty five (255).

The HMP operates similarly to the AMP, but uses two counters to compare the incoming numbered list to the hashtables and the wildcard hashtable. If the first counter becomes zero, the HMP indicates that there is no match. After the processing is complete, a non-zero counter indicates that the incoming numbered data list is present in the numbered list data set. The location and quantity of ones (1) present in the binary version of the counter indicates the location of the match and the number of times the incoming numbered list is present in the numbered list data set.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As used herein, the term "array" shall mean a data construct comprising a plurality of fields referenced by indexes, in which each field stores a value such as a binary, decimal, or hexadecimal number.

As used herein, the term "computer" shall mean a machine having a processor, a memory, and an operating system, capable of interaction with a user or other computer, and shall include without limitation firewalls, desktop computers, notebook computers, tablet personal computers, personal digital assistants (PDAs), servers, handheld computers, and similar devices.

As used herein, the term "field" shall mean an individual element within an array or a hashtable.

As used herein, the term "hashtable" shall mean a data construct comprising a plurality of fields referenced by keys, in which each field stores a value such as a binary, decimal, or hexadecimal number.

As used herein, the term "ID" shall mean an integer assigned to one of the numbered lists in a numbered list data set, wherein the ID is calculated by raising a fixed base number to a sequentially increasing power. The fixed base is typically two. The sequentially increasing power starts with zero and continues until each numbered list in the numbered list data set has been assigned an ID.

As used herein, the term "incoming numbered list" shall mean a numbered list that is compared to a numbered list data set. The present invention determines whether the incoming numbered list is present in the numbered list data set.

As used herein, the term "index" shall mean an integer or other character that allows direct access into an array without the need for a sequential search through the collection of fields.

As used herein, the term "key" shall mean an integer or other character that allows direct access into a hashtable without the need for a sequential search through the collection of fields.

As used herein, the term "MAXV" shall mean the maximum value of a number in a numbered list in a numbered list data set or an incoming numbered list. MAXV is chosen by a person of ordinary skill in the art such as an administrator of the present invention.

As used herein, the term "number" shall mean one of a plurality of integers separated by decimals in a numbered list.

As used herein, the term "numbered list" shall mean a plurality of numbers separated by decimals. A common example of a numbered list is an IP address.

As used herein, the term "numbered list data set" shall mean a plurality of numbered lists. The present invention determines whether the incoming numbered list is present in the numbered list data set.

As used herein, the term "recursion" shall mean the need to perform a plurality of similar computational steps from a single decision point in a computer program. Recursion is generally not preferable because of the increased computational time and increased probability of error.

As used herein, the term "translate" shall mean to convert between different bases for a number such as the binary, decimal, and hexadecimal bases.

As used herein, the term "value" shall mean the field entry from an array or hashtable.

As used herein, the term "wildcard" shall mean a keyboard character that can be used to represent one or many characters. The asterisk (*) typically represents one or more characters and the question mark (?) typically represents a single character.

As used herein, the term "wildcard array" shall mean an array or hashtable created to identify the location of wildcards in a numbered list data set.

Figure 2:
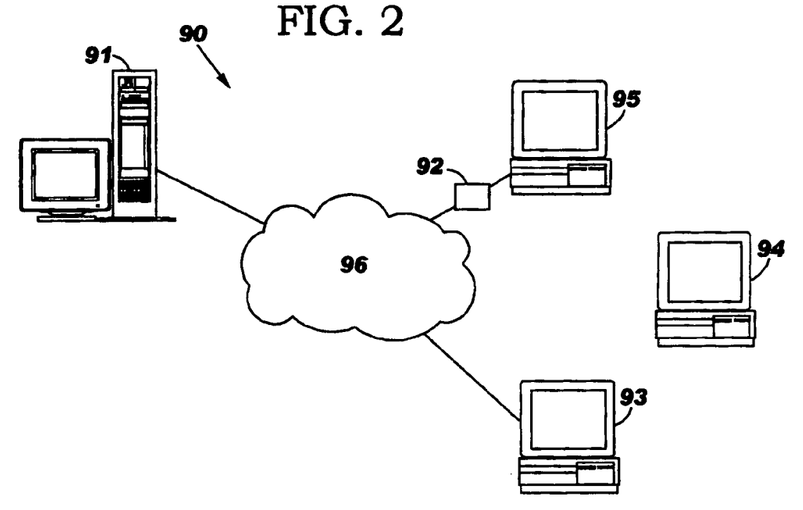
FIG. 2 is an illustration of a firewall and computer network of the present invention.

FIG. 2 is an illustration of computer network 90 associated with the present invention. Computer network 90 comprises local computer 95 electrically coupled to network 96 through firewall 92. Local computer 95 is electrically coupled to remote computer 94 and remote computer 93 via network 96 and firewall 92. Local computer 95 is also electrically coupled to server 91 via network 96 and firewall 92. Network 96 may be a simplified network connection such as a local area network (LAN) or may be a larger network such as a wide area network (WAN) or the Internet. Furthermore, computer network 90 depicted in FIG. 2 is intended as a representation of a possible operating network containing the present invention and is not meant as an architectural limitation.

Figure 3:
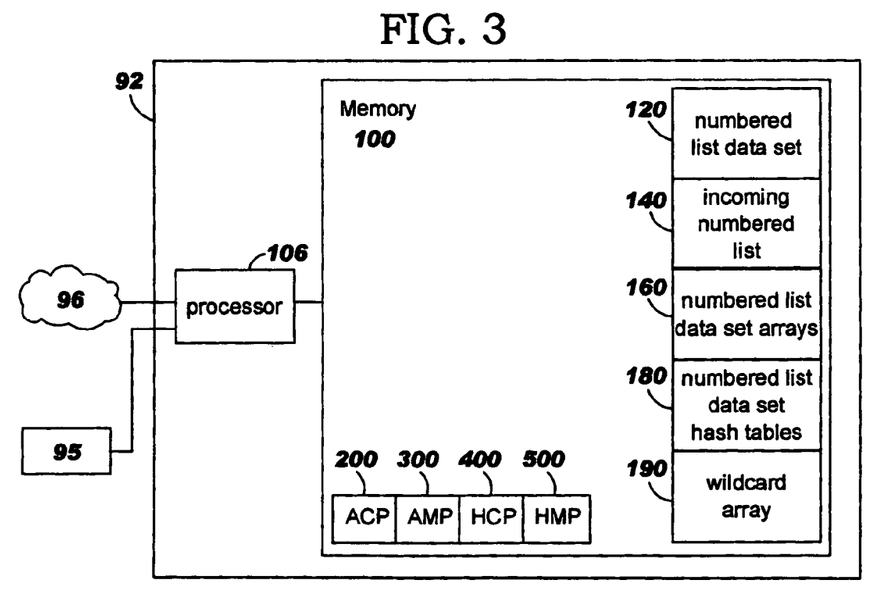
FIG. 3 is an illustration of a firewall, including a memory and a processor, associated with the present invention.

The internal configuration of a firewall, including connection and orientation of the processor, memory, and input/output devices, is well known in the art. The present invention may be a method, a stand alone firewall program, or a plug-in to an existing firewall program. Persons of ordinary skill in the art are aware of how to configure firewall programs, such as those described herein, to plug into an existing firewall program. Referring to FIG. 3, the methodology of the present invention is implemented on software by Array Creation Program (ACP) 200, Array Matching Program (AMP) 300, Hashtable Creation Program (HCP) 400, and Hashtable Matching Program (HMP) 500. ACP 200, AMP 300, HCP 400, and HMP 500 described herein can be stored within the memory of any firewall depicted in FIG. 2. Alternatively, ACP 200, AMP 300, HCP 400, and HMP 500 can be stored in an external storage device such as a removable disk, a CD-ROM, or a USB storage device. Memory 100 is illustrative of the memory within the firewall of FIG. 2. Memory 100 also contains numbered list data set 120, incoming numbered list 140, numbered list data set array 160, numbered list data set hashtables 180, and wildcard array 190.

Numbered list data set 120 is a database or computer file containing a plurality of numbered lists. Each numbered list comprises a plurality of numbers separated by decimals. Incoming numbered list 140 is a numbered list that needs to be routed to another computer. Incoming numbered list 140 is similar to the numbered lists in numbered list data set 120. Numbered list data set arrays are a plurality of arrays created by ACP 200 of the present invention. Numbered list data set hashtables 180 are a plurality of hashtables created by HCP 400 of the present invention. Wildcard array 190 is an array that identifies the location of wildcards in the numbered list data set when HCP 400 creates hashtables 180.

As part of the present invention, memory 100 can be configured with numbered list data set 120, incoming numbered list 140, numbered list data set array 160, numbered list data set hashtables 180, wildcard array 190, ACP 200, AMP 300, HCP 400, and/or HMP 500. Processor 106 can execute the instructions contained in ACP 200, AMP 300, HCP 400, and/or HMP 500. Processor 106 and memory 100 are part of a firewall such as firewall 92 in FIG. 2. Processor 106 can communicate with local computer 95 or other computers via network 96.

In alternative embodiments, numbered list data set 120, incoming numbered list 140, numbered list data set array 160, numbered list data set hashtables 180, wildcard array 190, ACP 200, AMP 300, HCP 400, and/or HMP 500 can be stored in the memory of computers. Storing numbered list data set 120, incoming numbered list 140, numbered list data set array 160, numbered list data set hashtables 180, wildcard array 190, ACP 200, AMP 300, HCP 400, and/or HMP 500 in the memory of computers allows the processor workload to be distributed across a plurality of processors instead of a single processor. Further configurations of numbered list data set 120, incoming numbered list 140, numbered list data set array 160, numbered list data set hashtables 180, wildcard array 190, ACP 200, AMP 300, HCP 400, and/or HMP 500 across various memories are known by persons of ordinary skill in the art.

The present invention utilizes binary (base 2), decimal (base 10), and hexadecimal (base 16) numbers in its calculations. Each group of numbers is useful for specific purposes. For example, binary numbers are useful for performing Boolean operations. Decimal numbers are useful for humans to comprehend. Hexadecimal numbers are useful because computers process bytes (eight bits), which can be represented by a two digit hexadecimal number. In order to avoid confusion between hexadecimal and decimal numbers, hexadecimal numbers are followed by an H or preceded by &, $, or 0x. Table 1 below summarizes the translation between decimal numbers 0 through 15 and their binary and hexadecimal counterparts.

TABLE 1

| Decimal (Base 10) | Binary (Base 2) | Hexadecimal (Base 16) |
| --- | --- | --- |
| 00 | 0000 | 0x0 |
| 01 | 0001 | 0x1 |
| 02 | 0010 | 0x2 |
| 03 | 0011 | 0x3 |
| 04 | 0100 | 0x4 |
| 05 | 0101 | 0x5 |
| 06 | 0110 | 0x6 |
| 07 | 0111 | 0x7 |
| 08 | 1000 | 0x8 |
| 09 | 1001 | 0x9 |
| 10 | 1010 | 0xA |
| 11 | 1011 | 0xB |
| 12 | 1100 | 0xC |
| 13 | 1101 | 0xD |
| 14 | 1110 | 0xE |
| 15 | 1111 | 0xF |

Persons of ordinary skill in the art are aware of how to translate between decimal, binary, and hexadecimal numbers.

When performing Boolean operations between binary numbers, the ones (1) represent true fields and the zeros (0) represent false fields. A Boolean AND operation determines whether all of the elements in a set are true. The results of the four different combinations of the Boolean AND operation are presented in Table 2 below.

TABLE 2

| a | b | a AND b |
| --- | --- | --- |
| 0 (False) | 0 (False) | 0 (False) |
| 0 (False) | 1 (True) | 0 (False) |
| 1 (True) | 0 (False) | 0 (False) |
| 1 (True) | 1 (True) | 1 (True) |

Thus, in a Boolean AND operation, the result will be false unless all of the elements of the operation are true. The Boolean AND operation is valid for any number of elements. Similarly, a Boolean OR operation determines whether any of the elements in a set are true. The results of the four different combinations of the Boolean OR operation are presented in Table 3 below.

TABLE 3

| a | b | a OR b |
|---|---|---|
| 0 (False) | 0 (False) | 0 (False) |
| 0 (False) | 1 (True) | 1 (True) |
| 1 (True) | 0 (False) | 1 (True) |
| 1 (True) | 1 (True) | 1 (True) |

Thus, in a Boolean OR operation, the result will be true unless all of the elements of the operation are false. The Boolean OR operation is valid for any number of elements.

Figure 4:
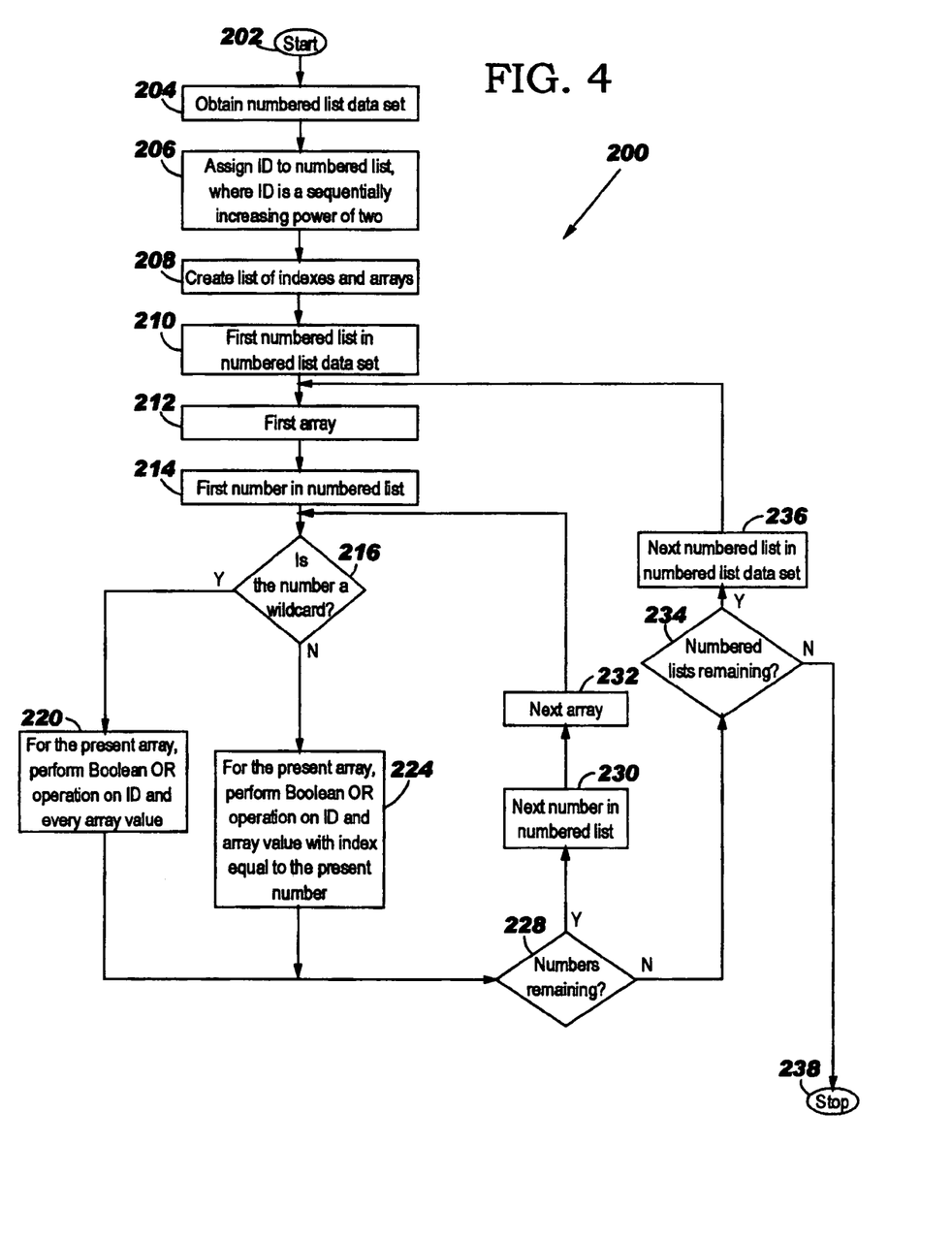
FIG. 4 is an illustration of the logic of the Array Creation Program (ACP) of the present invention.
Figure 5:
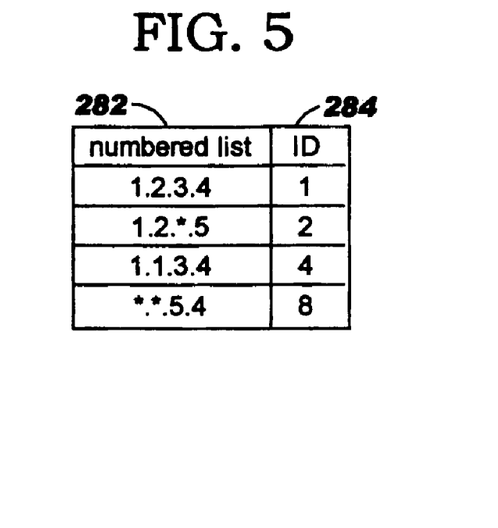
FIG. 5 is an illustration of the numbered list data set and the IDs assigned with each of the numbered lists in the numbered list data set of the present invention.

FIG. 4 is an illustration of the logic of Array Creation Program (ACP) 200 of the present invention. ACP 200 is a firewall program that creates a plurality of arrays from a numbered list data set. ACP 200 starts (202) whenever the firewall receives a new or updated numbered list data set. ACP 200 obtains the new or updated numbered list data set (204). The numbered list data set may be like numbered list data set 120 depicted in FIG. 3. ACP 200 then assigns IDs to the numbered lists (206). The ID values are sequentially increasing powers of two. For example, the first numbered list is assigned an ID of one ($2^0=1$), the second numbered list is assigned an ID of two ($2^1=2$), the third numbered list is assigned an ID of four ($2^2=4$) and so forth until every numbered list has been assigned an ID. FIG. 5 illustrates an example of a numbered list data set with IDs assigned to each numbered list.

Figure 6:
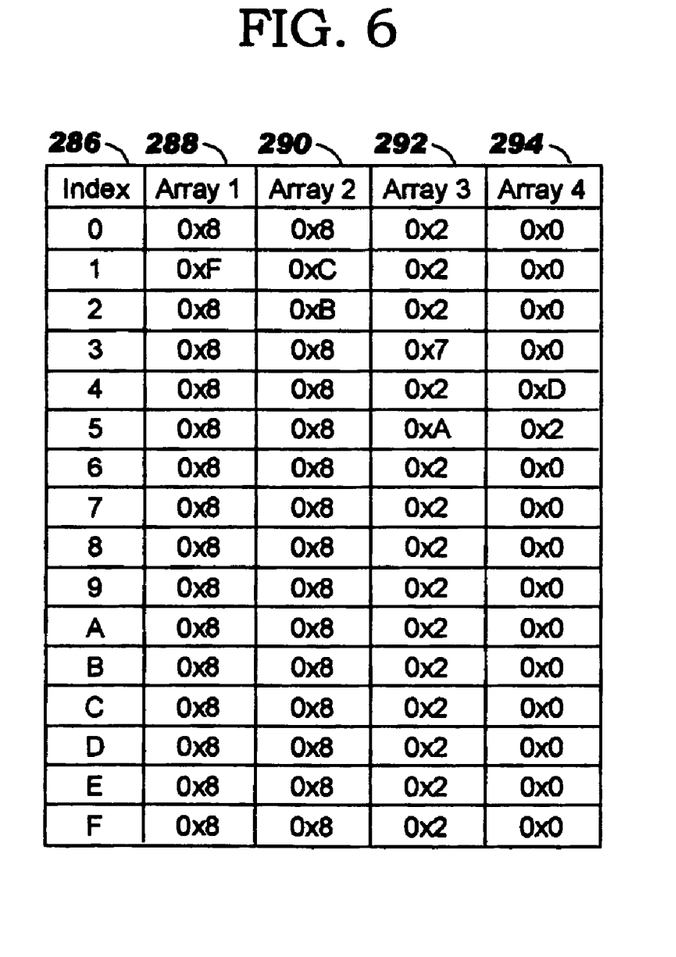
FIG. 6 is an illustration of the arrays created by the ACP of the present invention.

ACP 200 then creates a list of indexes and arrays (208). ACP 200 creates a number of arrays equal to the quantity of numbers in the numbered lists in the numbered list data set. For example, if the numbered list data set contains numbered lists with four numbers (i.e. 1.2.3.4), then ACP 200 creates four arrays. Each array is one field wide and MAXV fields long, where MAXV is the maximum value of a number in a numbered list in a numbered list data set or an incoming numbered list. MAXV is a number chosen by a person of ordinary skill in the art such as an administrator of the present invention. FIG. 6 illustrates an example of the arrays for a numbered list data set with four numbers and a MAXV of fifteen.

ACP 200 then proceeds to the first numbered list in the numbered list data set (210). ACP 200 processes the numbered list in an orderly method. Generally, the numbered lists are presented horizontally with each numbered list on a separate line. Therefore, when proceeding from one numbered list to another, ACP 200 proceeds to the numbered list on the next line. Persons of ordinary skill in the art are aware of other methods for processing the numbered lists. ACP 200 also proceeds to the first array (212). The array may be like numbered list data set array 160 illustrated in FIG. 3. ACP 200 processes the arrays in an orderly method. ACP 200 generally starts at the leftmost array and proceeds to the next array on the right. Persons of ordinary skill in the art are aware of other methods for processing the arrays. ACP 200 proceeds to the first number in the numbered list (214). ACP 200 also processes the numbers in an orderly method. ACP 200 generally starts at the leftmost number and proceeds to the next number on the right. Persons of ordinary skill in the art are aware of other methods for processing the numbers within a numbered list. ACP 200 then determines whether the number is a wildcard (216). If ACP 200 determines that the number is a wildcard, then ACP 200 performs a Boolean OR operation on the ID and every array value for the present array (220). In other words, at step 220 the number of Boolean OR operations will equal the number of array values in the present array. ACP 200 then proceeds to step 228.

If at step 216, ACP 200 determines that the number is not a wildcard, then ACP 200 performs a Boolean OR operation on the ID and the array value with an index equal to the number (224). In other words, at step 224 ACP 200 performs only one Boolean OR operation in the present array. ACP 200 then proceeds to step 228.

At step 228, ACP 200 determines whether there are numbers remaining in the present numbered list (228). If ACP 200 determines that there are numbers remaining in the numbered list, then ACP 200 proceeds to the next number in the numbered list (230) and the next array (232) and returns to step 216. The next number in a numbered list is the leftmost number that has not been processed by steps 216 through 226. The next array is the leftmost array that has not been processed by steps 216 through 226. If at step 228 ACP 200 determines that there are not any numbers remaining in the present numbered list, then ACP 200 determines whether there are any numbered lists remaining (234). If ACP 200 determines that there are numbered lists remaining, then ACP 200 proceeds to the next numbered list in the numbered list data set (236). The next numbered list is the highest numbered list that has not been processed by steps 212 through 232. ACP 200 then returns to step 212. If at step 234 ACP 200 determines that there are not any numbered lists remaining, then ACP 200 ends (238). FIG. 6 illustrates the arrays created by ACP 200.

FIG. 5 is an illustration of the IDs assigned to the numbered lists in the numbered list data set. The numbered lists from the numbered list data set are depicted in column 282. The IDs assigned to the numbered lists are depicted in column 284.

FIG. 6 is an illustration of the arrays created by ACP 200. FIG. 6 contains index 286 for the arrays. Array 288 is the array for the first number in the numbered list. Array 290 is the array for the second number in the numbered list. Array 292 is the array for the third number in the numbered list. Array 294 is the array for the fourth number in the numbered list. The numbers in the array fields in FIG. 6 containing the "0x" prefix are hexadecimal numbers.

Figure 7:
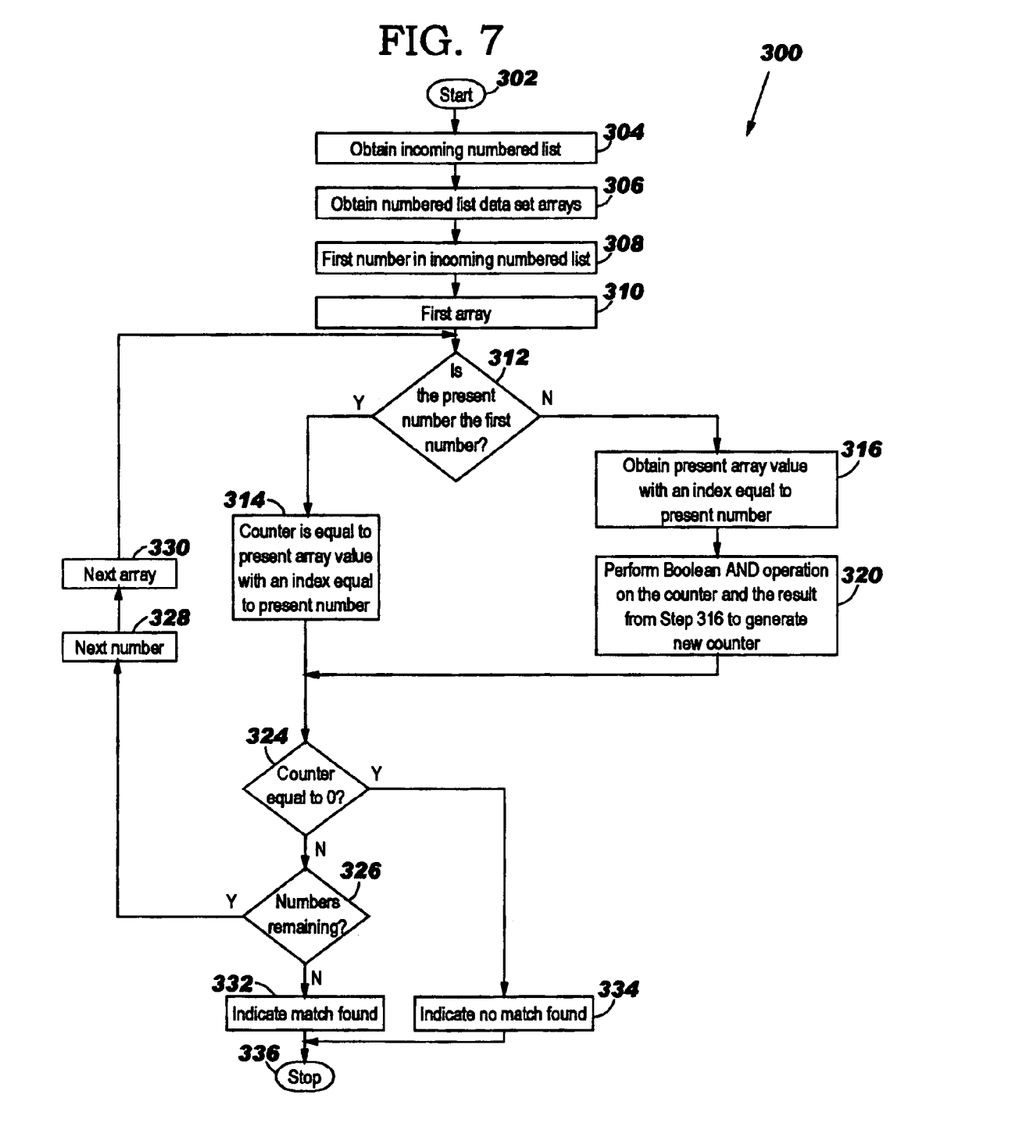
FIG. 7 is an illustration of the logic of the Array Matching Program (AMP) of the present invention.

FIG. 7 illustrates the logic of Array Matching Program (AMP) 300. AMP 300 is a firewall program that determines whether an incoming numbered list is present in a numbered list data set array by analyzing array values associated with the numbers in the incoming numbered list. Persons of ordinary skill in the art are aware of how to configure AMP 300 such that it will only indicate a match if the incoming numbered list contains the same quantity of numbers as the numbered lists in the numbered list data set. In other words, AMP 300 does not return a match for the incoming numbered list 1.2.3 when the numbered list data set is 1.2.3.4, 1.2.*.5, 1.1.3.4, and *.*.5.4. AMP 300 starts (302) whenever the firewall running the present invention receives an incoming numbered list. AMP 300 obtains the incoming numbered list (304). The incoming numbered list may be like incoming numbered list 140 depicted in FIG. 3. AMP 300 then obtains the numbered list data set arrays created by ACP 200 (306). AMP 300 then proceeds to the first number in the incoming numbered list (308) and the first array (310). The numbers in the incoming numbered list are processed similar to the numbers in the numbered lists in the numbered list data set in ACP 200. The arrays are also processed similar to the arrays in ACP 200. AMP 300 then proceeds to step 312.

At step 312, AMP 300 determines whether the present number in the incoming numbered list is the first number in the numbered list (312). If AMP 300 determines that the present number in the incoming numbered list is the first number in the numbered list, then AMP 300 sets the counter equal to the present array value with an index equal to the present number (314). AMP 300 then proceeds to step 324. If at step 312 AMP 300 determines that the present number in the incoming numbered list is not the first number in the numbered list, then AMP 300 obtains the present array value with an index equal to the present number (316). AMP 300 then performs a Boolean AND operation on the counter and the value from step 316, generating a new counter (320). In other words, the counter is set equal to the hexadecimal result of the Boolean AND operation. AMP 300 then proceeds to step 324.

At step 324, AMP 300 determines whether the counter is equal to zero (324). If AMP 300 determines that the counter is equal to zero, then AMP 300 indicates that the incoming numbered list is not present in the numbered list data set (334) and ends (336). If AMP 300 determines that the counter is not equal to zero, then AMP 300 determines whether there are numbers remaining in the incoming numbered list (326). If AMP 300 determines that there are numbers remaining in the incoming numbered list, then AMP 300 proceeds to the next number in the incoming numbered list (328). AMP 300 then proceeds to the next array (330) and returns to step 312. If at step 326 AMP 300 determines that there are not any numbers remaining in the incoming numbered list, then AMP 300 indicates that the incoming numbered list is present in the numbered list data set (332) and ends (336).

In an alternative embodiment, AMP 300 counts the quantity of ones (1s) present in the binary version of the counter when AMP 300 ends. The location and quantity of ones (1) present in the binary version of the counter indicates the location of the match and the number of times the incoming numbered list is present in the numbered list data set.

Figure 8A:
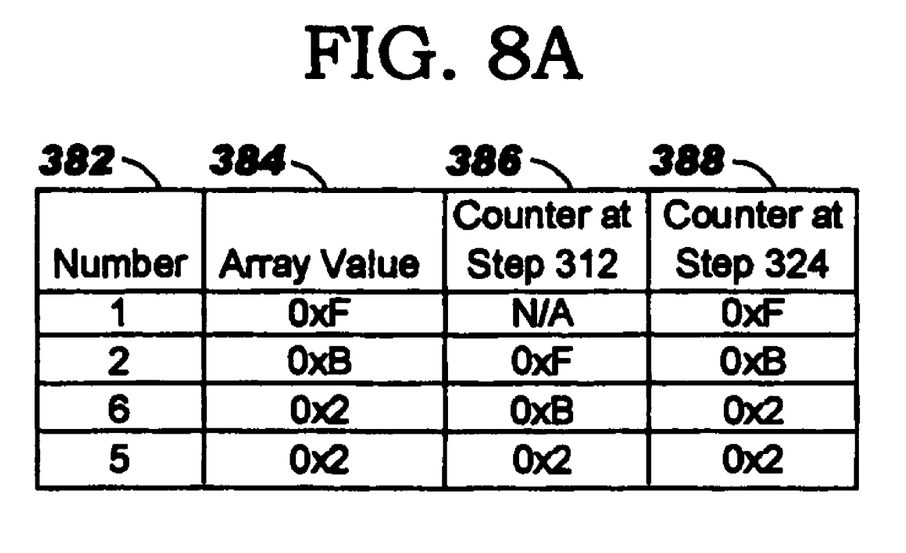
FIGS. 8A and 8B illustrate the calculations that the AMP performs when processing an incoming numbered list.
Figure 8B:
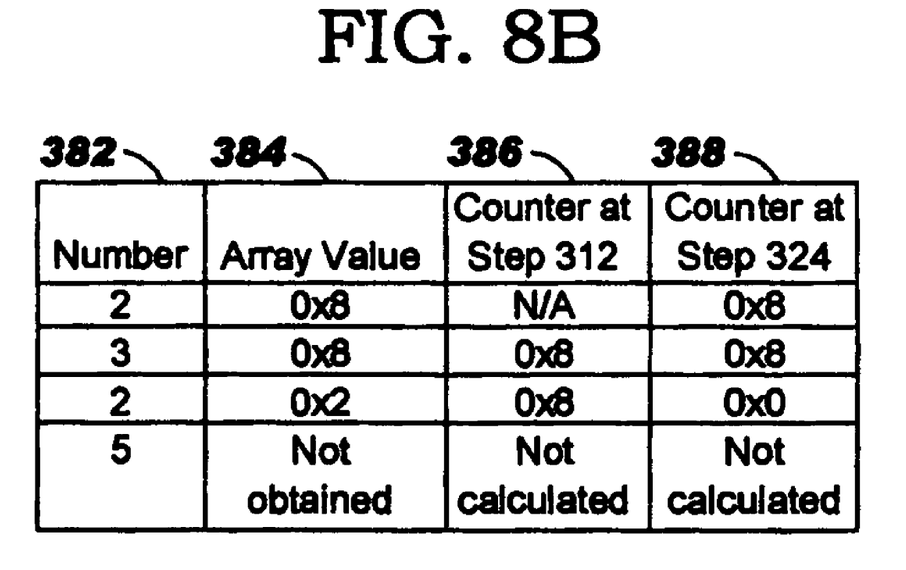

FIGS. 8A and 8B illustrate the calculations AMP 300 performs in processing the incoming numbered list. The incoming numbered list is depicted vertically in column 382. In FIG. 8A the incoming numbered list is 1.2.6.5 and in FIG. 8B the incoming numbered list is 2.3.2.5. The array values depicted in column 384 are calculated in steps 314 and 316 of AMP 300 and are values from the array depicted in FIG. 6. The counters depicted in column 386 are the counter values at step 312 of AMP 300. The counters depicted in column 388 are the counter values at step 324 of AMP 300. When a counter equals zero at step 324, AMP 300 does not need to process the remaining numbers in the numbered list because the incoming numbered list is not present in the numbered list data set.

A hashtable is a data construct that stores a set of items. Hashtables utilize less memory than arrays when there is a large quantity of numbered lists in the numbered list data sets. Each item in the hashtable has a key that identifies the item. Items are found, added, and removed from the hashtable by using the key. Table 4 outlines the differences between arrays and hashtables.

TABLE 4

| | Array | Hashtable |
| --- | --- | --- |
| Indexes/ Keys | Integer: arrays are always indexed on integers, and must be contiguous. | Any type: almost any data type can be used as key, including strings, integers, XPCOM interface pointers, IIDs, and almost anything else. Keyes can be disjunctive (i.e. you can store entries with keys 1, 5, and 3000). |

TABLE 4-continued

| | Array | Hashtable |
| --- | --- | --- |
| Lookup Time | Lookup time is a simple constant. | Lookup time is mostly-constant, but the constant time can be larger than an array lookup. |
| Sorting | Sorted: stored sorted; enumerated in a sorted fashion. | Unsorted: stored unsorted; cannot be enumerated in a sorted manner. |
| Inserting/ Removing | Adding and removing items from a large array can be time-consuming. | Adding and removing items from hashtables is a quick operation. |
| Wasted Space | None: Arrays are packed structures, so there is no wasted space. | Some: hashtables are not packed structures; depending on the implementation, there may be significant wasted memory. |

In their implementation, hashtables take the key and apply a mathematical hash function to "randomize" the keys and then use the hash to find the location in the hashtable. Good hashtable implementations will automatically resize the hashtable in memory if extra space is needed, or if too much space has been allocated. Hashtables are useful for: sets of data that need swift random access, with non-integral keys or non-contiguous integral keys, or where items will be frequently added or removed. Hashtables should not be used for: sets that need to be sorted, very small datasets (less than sixteen items), or data that does not need random access. In these situations, an array is more efficient. For example, hashtables would be referable to arrays when processing IPv6 addresses (version 6 IP addresses), which range from zero (0) to $2^{32}$. However arrays would be referable to hashtables when processing IPv4 (version 4 IP addresses, which range from zero (0) to two hundred fifty five (255). FIGS. 9 through 13 illustrate the present invention utilizing hashtables instead of arrays.

Figure 9:
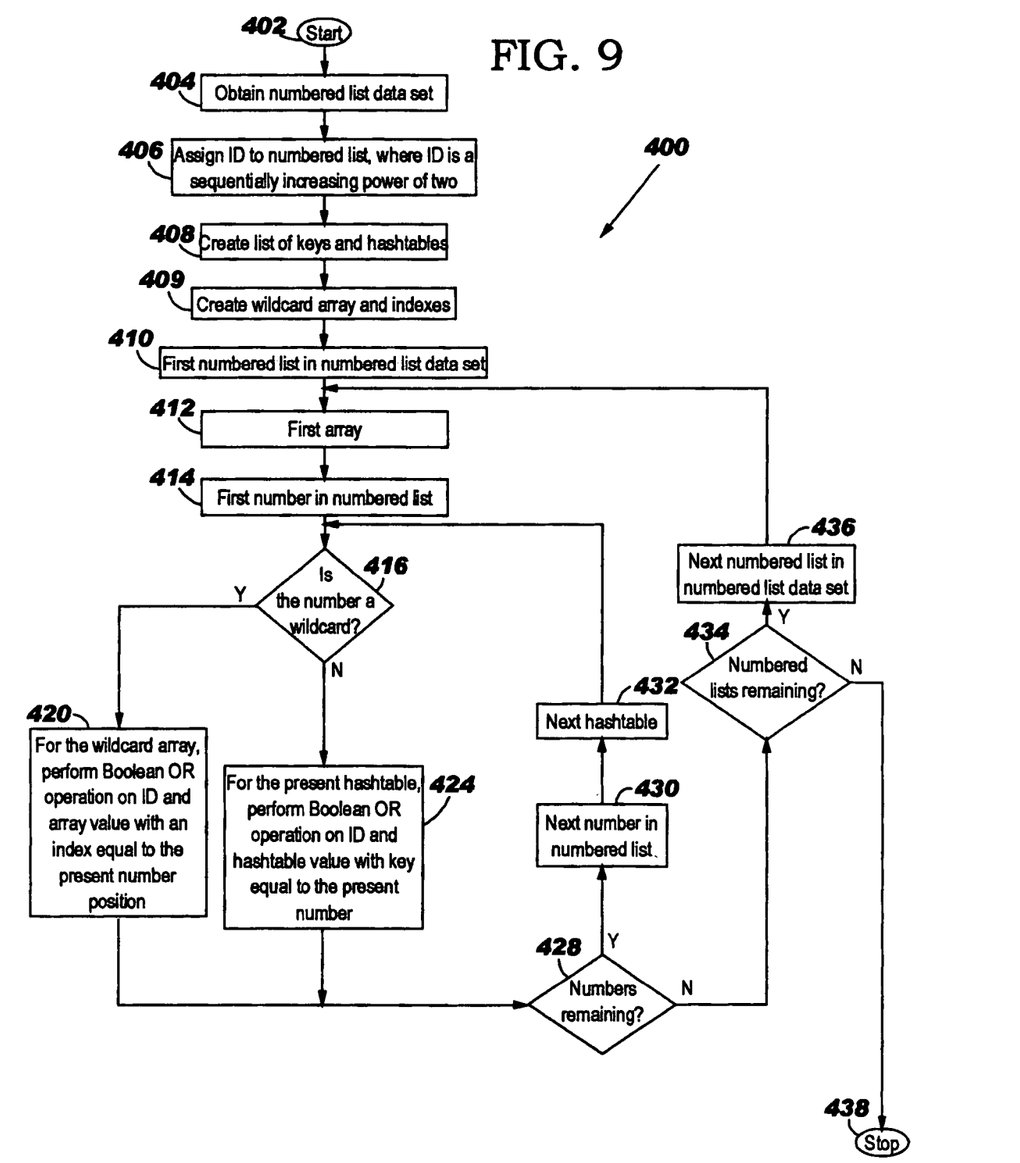
FIG. 9 is an illustration of the logic of the Hashtable Creation Program (HCP) of the present invention.

FIG. 9 is an illustration of the logic of Hashtable Creation Program (HCP) 400 of the present invention. HCP 400 is a firewall program that creates a plurality of hashtables from a numbered list data set. HCP 400 starts (402) whenever the firewall receives a new or updated numbered list data set. HCP 400 obtains the new or updated numbered list data set (404). The numbered list data set may be like numbered list data set 140 depicted in FIG. 3. HCP 400 then assigns IDs to the numbered lists (406). The ID values are sequentially increasing powers of two. For example, the first numbered list is assigned an ID of one ($2^0$=1), the second numbered list is assigned an ID of two ($2^1$=2), the third numbered list is assigned an ID of four ($2^2$=4) and so forth until every numbered list has been assigned an ID. FIG. 5 illustrates an example of a numbered list data set with IDs assigned to each numbered list.

Figure 10:
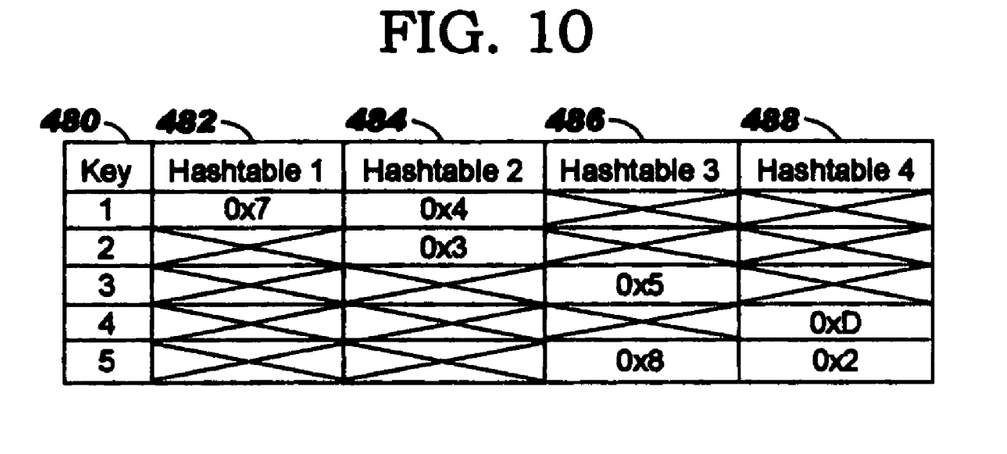
FIG. 10 is an illustration of the hashtables created by the HCP of the present invention.

HCP 400 then creates a list of keys and hashtables (408). HCP 400 creates a number of hashtables equal to the quantity of numbers in the numbered lists in the numbered list data set. For example, if the numbered list data set contains numbered lists with four numbers (i.e. 1.2.3.4), then HCP 400 creates four hashtables. Each hashtable is one field wide contains a key for each number present in that particular number position. The hashtables ignore the wildcard characters. For example, if the numbered list data set is 1.2.3.4, 1.2.*.5, 1.1.3.4, and *.*.5.4, then the first hashtable would only have a key of one because the first number position does not contain any other numbers but one. FIG. 10 illustrates an example of the hashtables for a numbered list data set from FIG. 5.

Figure 11:
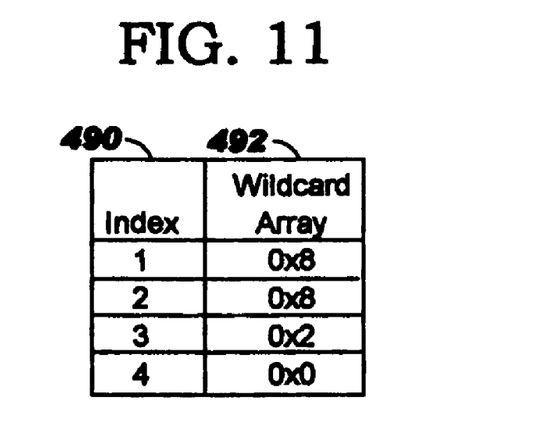
FIG. 11 is an illustration of an example of the wildcard array of the present invention.

HCP 400 then creates the wildcard array (409). The wildcard array may be like wildcard array 190 depicted in FIG. 3. The wildcard array is a single array with the same quantity of fields as the quantity of numbers in the numbered list data set. Each index in the wildcard array refers to a position in the numbered list data set (i.e. index one refers to the first position. An example of a wildcard array is illustrated in FIG. 11.

HCP 400 then proceeds to the first numbered list in the numbered list data set (410). HCP 400 processes the numbered list in an orderly method. Generally, the numbered lists are presented horizontally with each numbered list on a separate line. Therefore, when proceeding from one numbered list to another, HCP 400 proceeds to the numbered list on the next line. Persons of ordinary skill in the art are aware of other methods for processing the numbered lists. HCP 400 also proceeds to the first hashtable (412). The hashtable may be like numbered list data set hashtable 160 illustrated in FIG. 3. HCP 400 processes the hashtables in an orderly method. HCP 400 generally starts at the leftmost hashtable and proceeds to the next hashtable on the right. Persons of ordinary skill in the art are aware of other methods for processing the hashtables. HCP 400 proceeds to the first number in the numbered list (414). HCP 400 also processes the numbers in an orderly method. HCP 400 generally starts at the leftmost number and proceeds to the next number on the right. Persons of ordinary skill in the art are aware of other methods for processing the numbers within a numbered list.

HCP 400 then determines whether the number is a wildcard (416). If HCP 400 determines that the number is a wildcard, then HCP 400 performs a Boolean OR operation on the ID and the wildcard array value with an index equal to the present number position (420). In other words, at step 440 HCP 400 performs only one Boolean OR operation in the present array. If HCP 400 is processing the first number in a numbered list, then the number position is one. HCP 400 then proceeds to step 428.

If at step 416, HCP 400 determines that the number is not a wildcard, then HCP 400 performs a Boolean OR operation on the ID and the hashtable value with a key equal to the number (424). In other words, at step 424 HCP 400 performs only one Boolean OR operation in the present array. HCP 400 then proceeds to step 428.

At step 428, HCP 400 determines whether there are numbers remaining in the present numbered list (428). If HCP 400 determines that there are numbers remaining in the numbered list, then HCP 400 proceeds to the next number in the numbered list (430) and the next hashtable (432) and returns to step 416. The next number in a numbered list is the leftmost number that has not been processed by steps 416 through 426. The next hashtable is the leftmost hashtable that has not been processed by steps 416 through 426. If at step 428 HCP 400 determines that there are not any numbers remaining in the present numbered list, then HCP 400 determines whether there are any numbered lists remaining (434). If HCP 400 determines that there are numbered lists remaining, then HCP 400 proceeds to the next numbered list in the numbered list data set (436). The next numbered list is the highest numbered list that has not been processed by steps 412 through 432. HCP 400 then returns to step 412. If at step 434 HCP 400 determines that there are not any numbered lists remaining, then HCP 400 ends (438). FIG. 10 illustrates the hashtables created by HCP 400.

FIG. 10 is an illustration of the hashtables created by HCP 400. FIG. 10 contains key 480 for the hashtables. Each hashtable only has a key for the non-zero values within the hashtable. Thus, in some cases, the hashtable consumes less memory than the arrays. Hashtable 482 is the hashtable for the first number in the numbered list. Hashtable 484 is the hashtable for the second number in the numbered list. Hashtable 486 is the hashtable for the third number in the numbered list. Hashtable 488 is the hashtable for the fourth number in the numbered list. The numbers in the hashtable fields in FIG. 10 containing the "0x" prefix are hexadecimal numbers.

FIG. 11 illustrates the wildcard array created by HCP 400. Index 490 indicates the position of the wildcards in the numbered list data set. Array 492 indicates the value of the wildcard associated with the position indicated by index 490.

Figure 12:
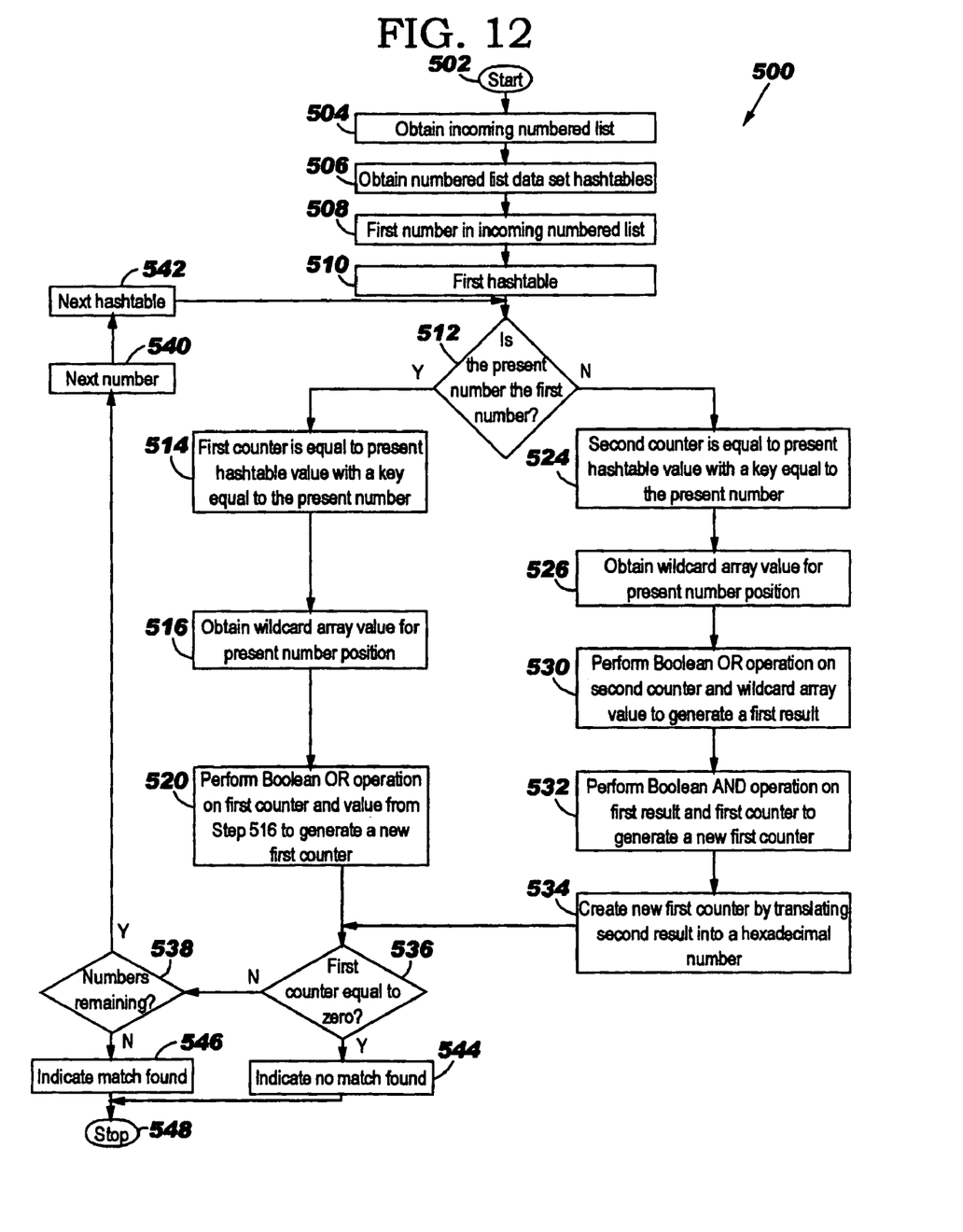
FIG. 12 is an illustration of the logic of the Hashtable Matching Program (HMP) of the present invention.

FIG. 12 illustrates the logic of Hashtable Matching Program (HMP) 500. HMP 500 is a firewall program that determines whether an incoming numbered list is present in a numbered list data set hashtable by analyzing hashtable values associated with the numbers in the incoming numbered list. Persons of ordinary skill in the art are aware of how to configure HMP 500 such that it will only indicate a match if the incoming numbered list contains the same quantity of numbers as the numbered lists in the numbered list data set. In other words, HMP 500 does not return a match for the incoming numbered list 1.2.3 when the numbered list data set is 1.2.3.4, 1.2.*.5, 1.1.3.4, and *.*.5.4. HMP 500 starts (502) whenever the firewall running the present invention receives an incoming numbered list. HMP 500 obtains the incoming numbered list (504). The incoming numbered list may be like incoming numbered list 140 depicted in FIG. 3. HMP 500 then obtains the numbered list data set hashtables created by HCP 400 (506). HMP 500 then proceeds to the first number in the incoming numbered list (508) and the first hashtable (510). The numbers in the incoming numbered list are processed similar to the numbers in the numbered lists in the numbered list data set in HCP 400. The hashtables are also processed similar to the hashtables in HCP 400. HMP 500 then proceeds to step 512.

At step 512, HMP 500 determines whether the present number in the incoming numbered list is the first number in the numbered list (512). If HMP 500 determines that the present number in the incoming numbered list is the first number in the numbered list, then HMP 500 sets the first counter equal to the present hashtable value with a key equal to the present number (514). HMP 500 obtains the wildcard array value with an index equal to the present number position (i.e. the first number) (516). HMP 500 then performs a Boolean OR operation on the first counter and the value from step 516, generating a new first counter (520). In other words, the first counter is set equal to the hexadecimal result of the Boolean OR operation. HMP 500 then proceeds to step 536.

If at step 512 HMP 500 determines that the present number in the incoming numbered list is not the first number in the numbered list, then HMP 500 sets the second counter equal to the present hashtable value with an key equal to the present number (524). HMP 500 obtains the wildcard array value with an index equal to the present number position (i.e. the second, third, or forth number) (526). HMP 500 then performs a Boolean OR operation on the second counter and the value from step 526, generating a first result (530). HMP 500 then performs a Boolean AND operation on the first result and the first counter, generating a new first counter (532). In other words, the first counter is set equal to the second hexadecimal result of the Boolean AND operation. HMP 500 then proceeds to step 536.

At step 536, HMP 500 determines whether the first counter is equal to zero (536). If HMP 500 determines that the first counter is equal to zero, then HMP 500 indicates that the incoming numbered list is not present in the numbered list data set (544) and ends (548). If HMP 500 determines that the first counter is not equal to zero, then HMP 500 determines whether there are numbers remaining in the incoming numbered list (538). If HMP 500 determines that there are numbers remaining in the incoming numbered list, then HMP 500 proceeds to the next number in the incoming numbered list (540). HMP 500 then proceeds to the next hashtable (542) and returns to step 512. If at step 538 HMP 500 determines that there are not any numbers remaining in the incoming numbered list, then HMP 500 indicates that the incoming numbered list is present in the numbered list data set (546) and ends (548).

In an alternative embodiment, HMP 500 counts the quantity of ones (1s) present in the binary version of the counter when HMP 500 ends. The location and quantity of ones (1) present in the binary version of the counter indicates the location of the match and the number of times the incoming numbered list is present in the numbered list data set.

Figure 13A:
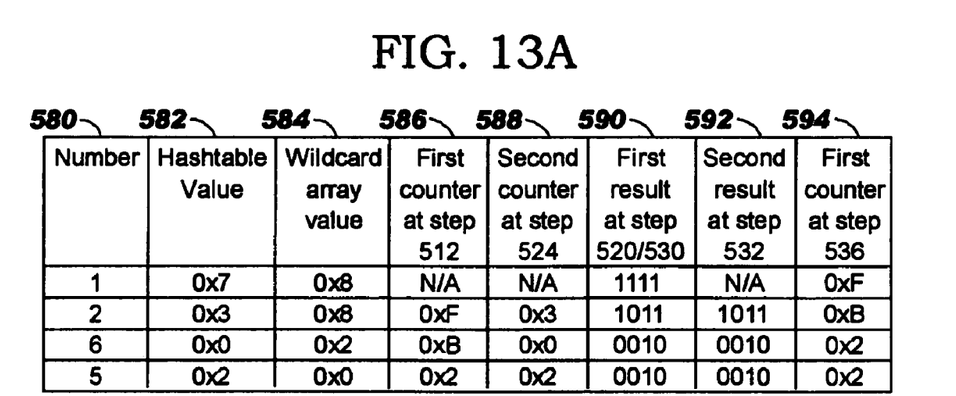
FIGS. 13A and 13B illustrate the calculations that the HMP performs when processing an incoming numbered list.
Figure 13B:
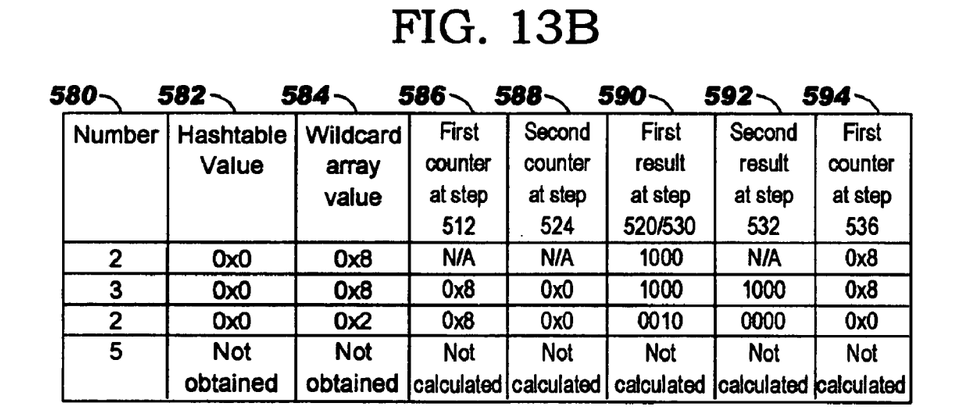

FIGS. 13A and 13B illustrate the calculations HMP 500 performs in processing the incoming numbered list. The incoming numbered list is depicted vertically in column 580. In FIG. 13A the incoming numbered list is 1.2.6.5 and in FIG. 13B the incoming numbered list is 2.5.2.5. The hashtable values depicted in column 582 are calculated in steps 514 and 524 of HMP 500 and are values from the hashtable depicted in FIG. 10. The wildcard array values depicted in column 584 are calculated in steps 516 and 526 of HMP 500 and are values from the wildcard array depicted in FIG. 11. The first counters depicted in column 586 are the first counter values at step 512 of HMP 500. The second counters depicted in column 588 are the counter values at step 524 of HMP 500. The first results depicted in column 590 are the first result values calculated at steps 520 and 530 of HMP 500. The second results depicted in column 592 are the second result values calculated at step 532 of HMP 500. The first counters depicted in column 594 are the first counter values at step 536 of HMP 500. When a counter equals zero at step 536, HMP 500 does not need to process the remaining numbers in the numbered list because the incoming numbered list is not present in the numbered list data set.

Persons of ordinary skill in the art will appreciate that the present invention may be configured to process incoming numbered lists that contain wildcard characters. If an incoming numbered list contains a wildcard character, a person of ordinary skill in the art could modify AMP 300 or HMP 500 to recognize the wildcard character. Upon recognition of the wildcard character, the present invention would perform a Boolean OR operation between the counter (in the case of AMP 300) or the first counter (in the case of HMP 500) and a value equal to sum of the IDs for the numbered lists in the numbered list data set (i.e. decimal 15 or binary 1111 in the example presented herein). The Boolean OR operation would be performed prior to determining if the counter or first counter is equal to zero.

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

What is claimed is:

1. A method for creating a plurality of arrays from a numbered list data set, the method comprising:
    installing a program on a computer;
    wherein the program performs steps comprising:
        obtaining a numbered list data set comprising a plurality of numbered lists, each of the plurality of numbered lists comprising a plurality of numbers separated by a decimal;
        assigning an ID to the numbered list;
        creating the plurality of arrays;
        performing a Boolean OR operation on the ID and an array value;
        determining whether a number of the plurality of numbers is a wildcard;
        responsive to a first determination that the number is the wildcard, translating the ID for the numbered list containing the number into the binary ID;
        responsive to the first determination that the number is the wildcard, translating a plurality of the array values for the array associated with the number into a plurality of the binary array values;
        responsive to a second determination that the number is not the wildcard, translating the ID for the numbered list containing the number into a binary ID; and
        responsive to the second determination that the number is not the wildcard, translating the array value with an index equal to the number for the array associated with the number into a binary array value;
    wherein the computer can determine whether an incoming numbered list is present in the numbered list data set by analyzing the arrays;
    wherein the computer is a firewall;
    wherein the IDs are sequentially increasing powers of two;
    wherein the quantity of arrays equals the quantity of numbers in the numbered lists; and
    wherein the arrays are MAXV fields long, MAXV being the maximum value of any number in the numbered lists or the incoming numbered list.

2. The method of claim 1 wherein the program performs steps further comprising:
    translating the binary array value into a hexadecimal array value or a decimal array value.

3. A method for determining whether an incoming numbered list is present in a numbered list data set, the method comprising:
    installing a program on a computer;
    wherein the program performs steps comprising:
        obtaining the incoming numbered list; and
        obtaining a plurality of numbered list data set arrays;
        determining whether a number is the first number in the incoming numbered list;
        responsive to a first determination that the number is the first number in the incoming numbered list, setting a counter equal to an array value with an index equal to the number;
        setting the counter equal to the result;
        determining whether the counter is equal to zero; and
        responsive to a second determination that the counter is equal to zero, indicating that the incoming numbered list is not present in the numbered list data set;
        responsive to a third determination that the counter is not equal to zero, indicating that the incoming numbered list is present in the numbered list data set;

responsive to a fourth determination that the number is not the first number in the incoming numbered list, performing steps comprising:
  translating the counter into a binary counter;
  translating the array value with the index equal to the number into a binary array value;
  translating the result into a hexadecimal result or a decimal result;
  determining whether the number is a wildcard;
  responsive to a fifth determination that the number is a wildcard, performing a Boolean OR operation between the counter and a value equal to sum of a plurality of IDs for the numbered lists in the numbered list data set;
  wherein the computer can determine whether the incoming numbered list is present in the numbered list data set by analyzing the counter;
  wherein the computer is a firewall;
  wherein the incoming numbered list comprises a plurality of the numbers separated by decimals;
  wherein the quantity of ones present in the binary counter indicates a first location of a match between the incoming numbered list and the numbered list data set; and
  wherein a second location of ones present in the binary version of the counter indicates the number of times the incoming numbered list is present in the numbered list data set.

4. A computer implemented method for determining whether an incoming numbered list is present in a numbered list data set, the computer implemented method comprising:
  obtaining the numbered list data set comprising a plurality of numbered lists;
  wherein the numbered lists comprise a plurality of numbers separated by decimals;
  assigning a plurality of IDs to the numbered lists;
  wherein the IDs are sequentially increasing powers of two;
  creating a plurality of arrays;
  wherein the quantity of arrays equals the quantity of numbers in the numbered lists;
  wherein the arrays are MAXV fields long, MAXV being the maximum value of any number in the numbered lists or an incoming numbered list;
  determining whether one of the numbers is a wildcard;
  responsive to the determination that the number is the wildcard, translating the ID for the numbered list containing the number into a binary ID;
  responsive to the determination that the number is the wildcard, translating a plurality of array values for the array associated with the number into a plurality of binary array values;
  responsive to the determination that the number is not the wildcard, translating the ID for the numbered list containing the number into the binary ID;
  responsive to the determination that the number is not the wildcard, translating the array value with an index equal to the number for the array associated with the number into the binary array value;
  performing a Boolean OR operation on the ID and the array value;
  translating the binary array values into a hexadecimal array value or a decimal array value;
  obtaining the incoming numbered list;
  wherein the incoming numbered list comprises the plurality of numbers separated by decimals;
  determining whether a number is the first number in the incoming numbered list;
  responsive to the determination that the number is the first number in the incoming numbered list, means for setting a counter equal to the array value with the index equal to the number;
  responsive to the determination that the number is not the first number in the incoming numbered list, the method further comprises:
    obtaining the array value with the index equal to the number;
    translating the counter and the array value with the index equal to the number into binary numbers;
    performing a Boolean AND operation to generate a result;
    translating the result into a hexadecimal result or a decimal result;
    setting the counter equal to the result;
    determining whether the counter is equal to zero;
  responsive to the determination that the counter is equal to zero, indicating that the numbered list is not present in the numbered list data set;
  responsive to the determination that the counter is not equal to zero, indicating that the numbered list is present in the numbered list data set;
  determining whether the number is the wildcard;
  responsive to the determination that the number is the wildcard, performing the Boolean OR operation between the counter and a value equal to sum of the IDs for the numbered lists in the numbered list data set;
  wherein the computer is a firewall;
  wherein the quantity of ones present in the binary counter indicates the location of the match between the incoming numbered list and the numbered list data set; and
  wherein the location of ones present in the binary counter indicates the number of times the incoming numbered list is present in the numbered list data set.

5. A computer implemented method for filtering data packets through a firewall to reduce a number of computation steps required to determine whether an incoming numbered list is present in a numbered list data set when the incoming numbered list contains a wildcard character, the computer implemented method comprising:
  obtaining the incoming numbered list;
  assigning an ID to the incoming numbered list;
  creating a list of indexes and a number of arrays, the number of arrays equal to a quantity of numbers in the incoming numbered list;
  for each array, determining whether a number in the numbered list is a wildcard;
  when a number in the number list is a wildcard, performing a Boolean OR operation on the ID and an on every array value; and translating the ID for the numbered list containing the number into a binary ID and translating a plurality of array values for an array associated with the number into a plurality of binary array values;
  when a number in the numbered list is not a wildcard, performing a Boolean OR operation on the ID and only on an array value with an index equal to the number;
  wherein a computer reduces the number of computations required to determine when an incoming numbered list containing a wildcard is present in the numbered list data set by analyzing the number of arrays; and
  wherein the computer is a firewall.

6. A computer implemented method for creating a plurality of arrays from a numbered list data set, the computer implemented method comprising:
  obtaining a numbered list data set containing a plurality of numbered lists;

assigning an ID to a numbered list;
creating the plurality of arrays;
performing a Boolean OR operation on the ID and an array value;
determining whether one of the numbers is a wildcard; and
responsive to the determination that the number is the wildcard, translating the ID for the numbered list containing the number into the binary ID and translating a plurality of the array values for the array associated with the number into a plurality of the binary array values;
wherein a computer determines whether an incoming numbered list is present in the numbered list data set by analyzing the arrays; and
wherein the computer is a firewall.

* * * * *